US 11,236,803 B1

United States Patent
Billmeyer

(10) Patent No.: US 11,236,803 B1
(45) Date of Patent: Feb. 1, 2022

(54) NUTATIONAL CYCLOIDAL REDUCER

(71) Applicant: Oasis Collective Inc., Sleepy Hollow, IL (US)

(72) Inventor: Bruce A. Billmeyer, Sleepy Hollow, IL (US)

(73) Assignee: Oasis Collective Inc., Sleepy Hollow, IL (US)

( * ) Notice: Subject to any disclaimer, the term of this patent is extended or adjusted under 35 U.S.C. 154(b) by 0 days.

(21) Appl. No.: 17/121,151

(22) Filed: Dec. 14, 2020

(51) Int. Cl.
| | |
|---|---|
| *F16H 1/32* | (2006.01) |
| *F16H 55/17* | (2006.01) |
| *F16H 55/08* | (2006.01) |
| *F16H 13/08* | (2006.01) |

(52) U.S. Cl.
CPC ............. *F16H 1/32* (2013.01); *F16H 13/08* (2013.01); *F16H 55/08* (2013.01); *F16H 55/17* (2013.01)

(58) Field of Classification Search
None
See application file for complete search history.

(56) References Cited

U.S. PATENT DOCUMENTS

| | | | | | |
|---|---|---|---|---|---|
| 1,538,008 | A | * | 5/1925 | Sharkey | F16H 55/08 475/180 |
| 3,217,566 | A | * | 11/1965 | Sanson | F16H 1/24 475/175 |
| 4,429,595 | A | * | 2/1984 | Butterfield | F16D 3/04 475/168 |
| 5,429,556 | A | * | 7/1995 | Ishida | F16H 1/32 475/180 |

\* cited by examiner

*Primary Examiner* — Colby M Hansen
(74) *Attorney, Agent, or Firm* — Levenfeld Pearlstein, LLC

(57) ABSTRACT

A nutational cycloidal reducer reduces an input speed to an output speed by a reduction ratio. The reducer includes a timing ring having an internal wall with a series of longitudinally extending tooth profiles, an output connected to the timing ring, a pulley having a central opening, a series of longitudinally extending tooth profiles and a plurality of circumferentially disposed pin bores. An input shaft has first and second shaft portions. The first portion is concentric with a longitudinal axis and the second portion is eccentric to the axis. A plate has a central opening. The pulley is positioned in the timing ring with some of the pulley and timing ring tooth profiles engaged with each other. The second shaft portion is positioned in the pulley and the plate and drives the pulley in a nutational movement. The pulley has one or more less tooth profiles than the timing ring, such that the reduction ratio is defined by # of timing ring tooth profiles/(# of timing ring tooth profiles-# of pulley tooth profiles).

20 Claims, 6 Drawing Sheets

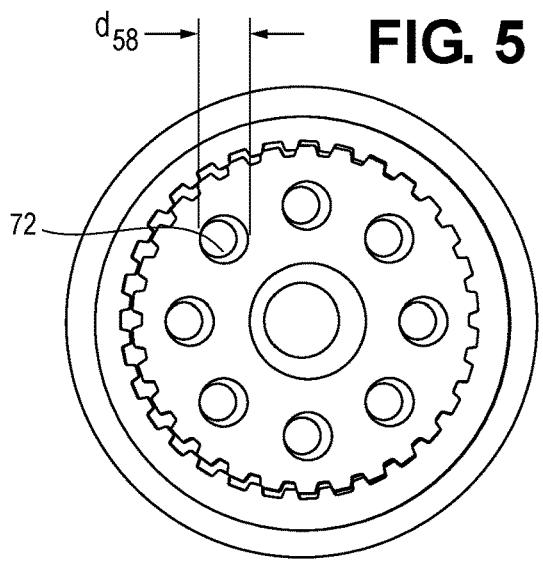
FIG. 5
FIG. 6
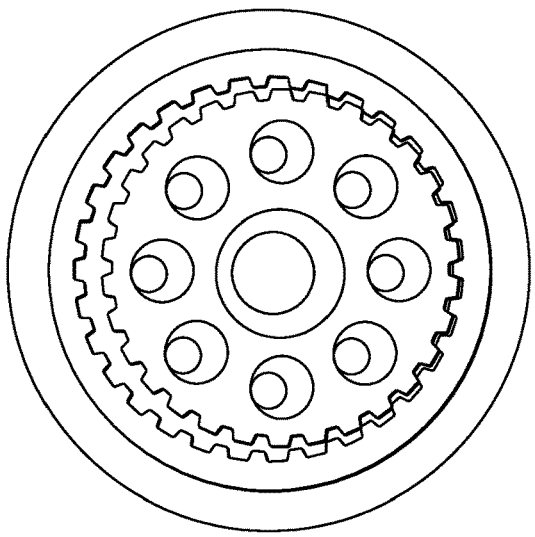
FIG. 7
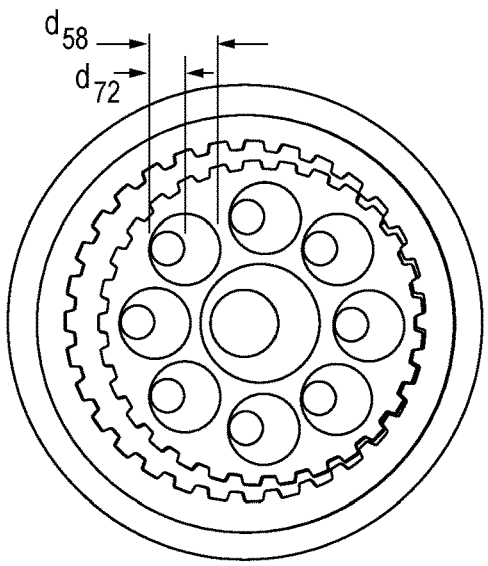

NUTATIONAL CYCLOIDAL REDUCER

BACKGROUND

The following description relates generally to speed reducers or torque changers and more particularly to cycloidal reducers.

Gearing is often used between a driver and a driven component to, for example, change the speed or torque of the driver to a speed or torque needed for the driven component. For example, gearing can be used between a motor and a fan to drive the fan at a different speed than the motor output.

Gear reducers or speed reducers, often referred to as gearboxes, essentially are power transmission devices that use a gear arrangement in an enclosed housing to transfer energy, change torque and change speed from one device to another. Often these devices ae used to increase torque and reduce speed from the drive (e.g., a motor) to a driven device.

Gearboxes consist of gears arranged in a housing with a method for attaching to the drive, typically a motor or drive shaft and the output component, usually via a shaft. The gears are mounted on shafts, which are typically supported by and rotate via rolling elements, such as bearings. The gearbox is a mechanical method of transferring energy from one device to another and is used to change torque and speed, usually to increase torque while reducing speed.

Currently, speed and torque modification with fractional and sub-fractional motors use a combination of spur gears, helical gears, worm gears and/or bevel gears to achieve a output speed and/or torque. In known gearing, the speed and torque change is produced from a single gear tooth-on-tooth interaction. For example, on a simple spur gear system, when the two gears mesh (to change speed or transfer torque) only a single tooth on each a drive gear and a driven gear interact and interface to change speed or transfer torque.

Often, the gearbox is located at the junction point of a power shaft. Gearboxes are manufactured with a specific purpose in mind and the gear ratio used is designed to provide the level of force required. This ratio is fixed and cannot be changed once the box is constructed. The only possible modification after the fact is an adjustment that allows the shaft speed to increase, along with a corresponding reduction in torque.

In a situation where multiple gear speeds are needed, a transmission with multiple gears can be used to change the torque and the speed.

While known torque/speed change gearboxes function well for their intended purposes, there are drawbacks. For example, the gear ratio is fixed and cannot be changed once the box is constructed unless an adjustment is made that allows the shaft speed to increase, along with a corresponding reduction in torque. This is often a labor intensive undertaking and a preferred way in which the speed change is accomplished is a replacement of the entirety of the gear train.

Moreover, the gears in known gearboxes or reducers have a one-tooth to one-tooth (or single tooth) contact. That is, a single tooth on one gear contacts a single tooth on the other gear. Furthermore, in known gearing (reducers) the meshing of the gears may be noisy (e.g., may induce vibrations) and will have backlash.

Accordingly, there is a need for a reducer that reduces an input rotational speed to an output rotational speed by a reduction ratio. Desirably such a reducer can be staged to provide greater reduction ratios, with ratios as much as 100:1 per stage or 10,000:1 for two stages. More desirably still, such a reducer provides speed reduction/torque multiplication in a small envelope with light weight component. Still more desirably, in such a reducer the reduction ratio can be readily changed.

SUMMARY

In embodiments, a nutational cycloidal reducer reduces an input rotational speed to an output rotational speed by a reduction ratio. The reducer includes a timing ring, an output, a pulley, an input shaft and a limiting member.

The timing ring can have a circular cross-section defining an axis and having a length. The timing ring has an internal wall having a series of longitudinally extending tooth profiles. An output is operably connected to the timing ring. The output can be, for example, a shaft. The shaft can be formed integral with the timing ring.

The pulley has a body having a central opening and a series of longitudinally extending tooth profiles matching the timing ring tooth profiles. The input shaft has a first shaft portion, a second shaft portion and a longitudinal axis. The first shaft portion is concentric with the longitudinal axis and the second shaft portion is eccentric with the longitudinal axis.

In an embodiment, the limiting member is a pin plate having a body having a central opening. The pulley is positioned in the timing ring with some of the plurality of pulley longitudinally tooth profiles engaged with some of the plurality of timing ring tooth profiles. The second shaft portion is positioned in the pulley central opening. The limiting member limits movement of the pulley to a nutational movement (a wobbling movement). The input shaft first portion positioned in the drive plate and the second portion positioned in the pulley central opening.

The input shaft drives the pulley in a nutational movement in the timing ring engaging some of the plurality of pulley longitudinally extending tooth profiles with some of the plurality of timing ring longitudinally extending tooth profiles, which drives the timing ring and output concentrically.

In embodiments, the pulley has one or more less longitudinally extending tooth profiles than the timing ring, and wherein a reduction ratio is defined by $$\frac{\text{\# of timing ring longitudinally extending tooth profiles}}{(\text{\# of timing ring longitudinally extending tooth profiles} - \text{\# of pulley longitudinally extending tooth profiles})}$$

In embodiments, the pulley has a plurality of circumferentially disposed pin bores formed in the body and the limiting member is a pin plate having a plurality of pins extending from a side thereof. Engagement of the pins in the pin bores limits movement of the pulley to a nutational movement (the wobbling) of the pulley. The pulley can include, for example, 8 pin bores and the pin plate can include 8 pins that insert into and cooperate with the pin bores. In embodiments the input shaft second portion is formed as an overmold over the input shaft first portion.

The reducer can further include a housing, with the timing ring, pulley and drive plate or pin plate positioned in the housing. End caps can be positions on the ends of the housing. The reducer can further include a bearing, such as a sleeve bearing positioned on the output at about one of the end caps.

In embodiments the timing ring includes 30 longitudinally extending tooth profiles and the pulley includes 29 longitudinally extending tooth profiles, and the reducer has a 30:1 reduction ratio. In other embodiments the timing ring includes 30 longitudinally extending tooth profiles and the pulley includes 28 longitudinally extending tooth profiles, and the reducer has a 15:1 reduction ratio. In still other embodiments the timing ring includes 30 longitudinally extending tooth profiles and the pulley includes 27 longitudinally extending tooth profiles, and the reducer has a 10:1 reduction ratio.

The reducer can be staged to provide greater reduction ratios, with ratios as much as 100:1 per stage or 10,000:1 for two stages, (For example, a 100:1 reduction ratio can be accomplished with a timing ring having 100 tooth profiles and a pulley having 99 tooth profiles.) The reducer also multiplies torque in direct proportion to the reduction ratio, providing a 92% mechanical efficiency for a single-stage reducer, and a 84% efficiency for a two-stage reducer.

The reducer can operate in forward and reverse and be scaled to accommodate the desired parameters and requirements. The reducer has low noise with no vibration, and zero backlash. Reduction ratios can be change with only two parts need to be changed as there are only three moving parts per stage. The reducer is anticipated to have a long service life with minimal or no maintenance and can accommodate any motor interface.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 5 is a sectional illustration of an embodiment of the nutational cycloidal reducer configured to provide a 30:1 reduction ratio;

FIG. 6 is a sectional illustration of an embodiment of the nutational cycloidal reducer configured to provide a 15:1 reduction ratio;

FIG. 7 is a sectional illustration of an embodiment of the nutational cycloidal reducer configured to provide a 10:1 reduction ratio;

DETAILED DESCRIPTION

Figure 1:
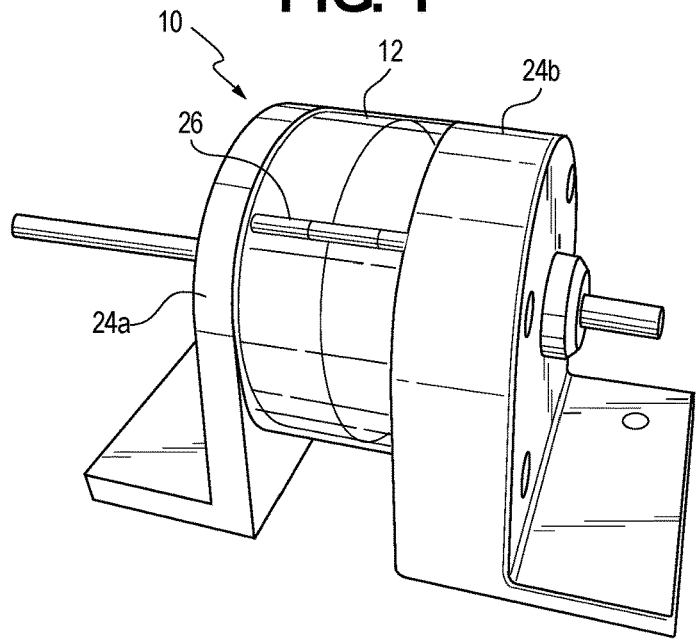
FIG. 1 is a perspective view of an embodiment of a nutational cycloidal reducer shown assembled.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
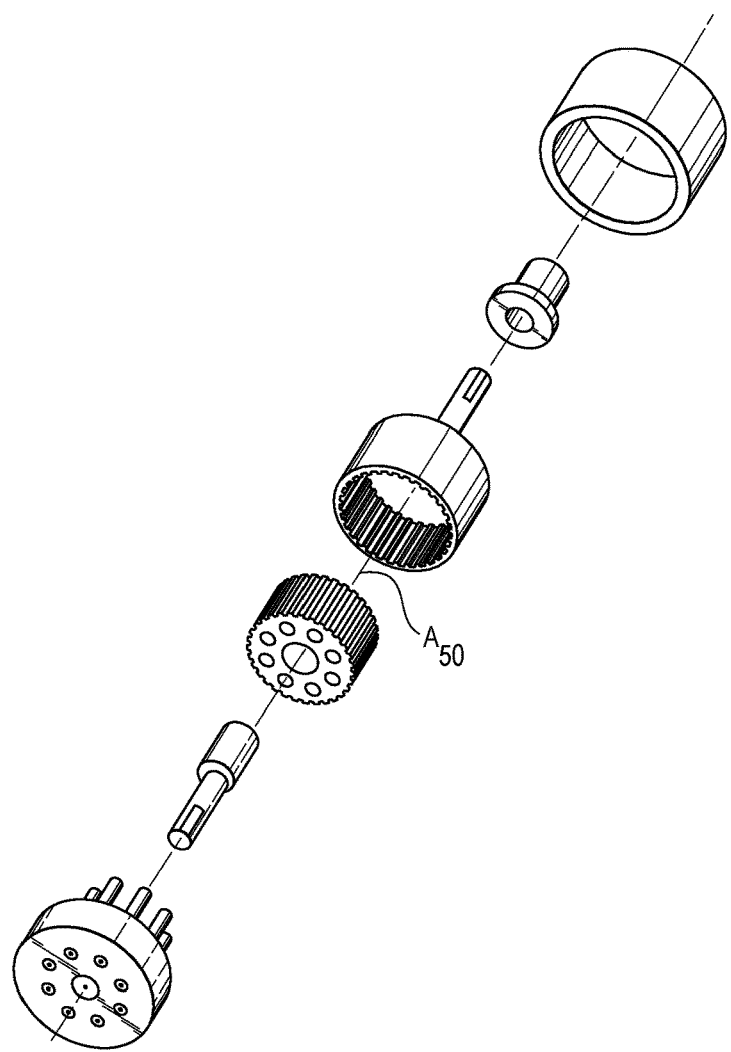
FIG. 2 is an exploded perspective view of an embodiment of a nutational cycloidal reducer.

Referring to FIGS. 1 and 2, there is shown a nutational cycloidal reducer ("reducer") 10 in accordance with an embodiment. The reducer 10 can be staged to provide reduction ratios as much as 100:1 per stage or 10,000:1 for two stages. The reducer 10 also multiplies torque in direct proportion to the reduction ratio, providing a 92% mechanical efficiency for a single-stage reducer, and a 84% efficiency for a two-stage reducer. The reducer 10 can be scaled to accommodate the desired parameters and requirements.

The reducer 10 includes, generally, a housing 12, a sleeve bearing 14, a timing ring 16, a pulley 18, an input shaft 20 and a drive plate 22. In an embodiment, the sleeve bearing 14, timing ring 16, pulley 18, input shaft 20, and drive plate 22 are all contained within the housing 12. The reducer 10 can include end caps 24a,b on either side of the housing 12 to enclose the reducer 10 components. Fasteners, such as bolts 26 can extend through openings in the end caps 24a,b to secure the reducer 10 in an assembled manner. In embodiments, the drive plate 22 is configured as a pin plate.

Figure 3A:
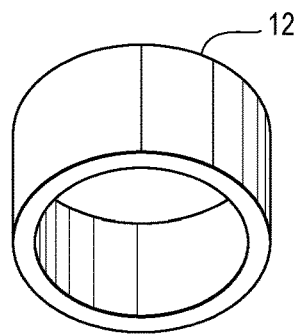
FIGS. 3A-3F are perspective views of embodiments of the housing (FIG. 3A), sleeve bearing (FIG. 3B), timing ring (FIG. 3C), pulley (FIG. 3D), input shaft (FIG. 3E), and pin plate (FIG. 3F)
Figure 3B:
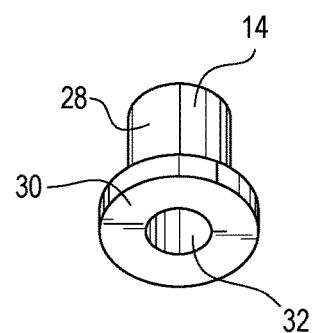

As seen in FIGS. 2 and 3A, the housing 12 is a hollow cylindrical member that, as noted above, encloses the reducer 10 components. Referring to FIG. 3B, the sleeve bearing 14 includes a body 28 and an end flange 30. A through bore 32 extends through the body 28 and end flange 30.

Figure 3C:
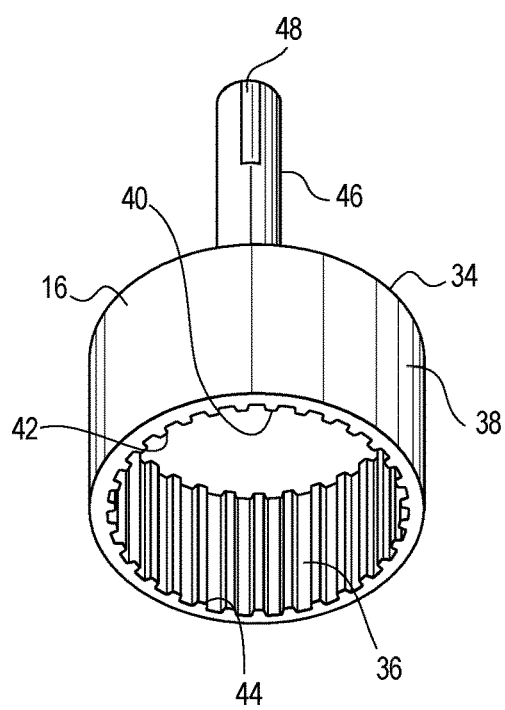
Figure 9:
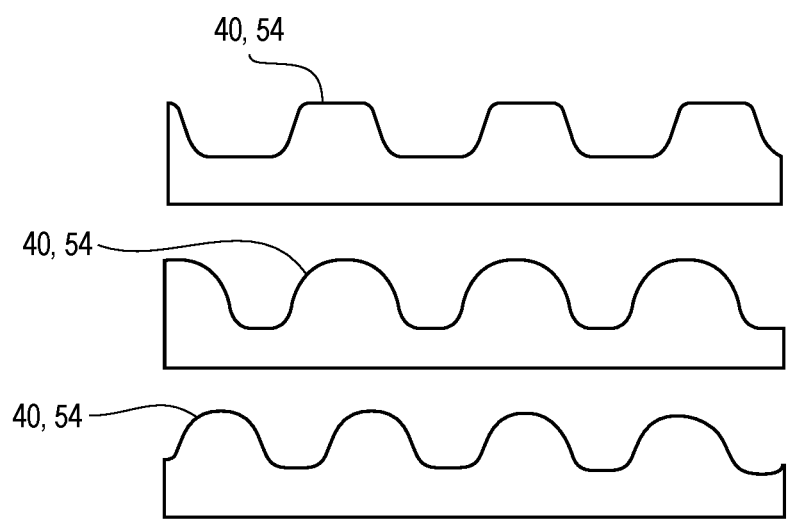
FIG. 9 illustrates various timing ring/belt and pulley profiles.

The timing ring 16 is illustrated in FIGS. 2 and 3C. The timing ring 16 includes a cup-shaped body 34 having an internal timing belt/pulley profile 36 in the cup portion 38. In embodiments, the internal timing belt profile 36 is formed as a series of equally spaced, symmetrical, longitudinally oriented geometrically dimensioned profile pulley tooth forms or tooth profiles 40 having a raised central ridge 42 formed along an interior wall 44 of the body 34. Viewed another way, the tooth profiles 40 may be characterized as an elongated gear tooth profile having a geometrically dimensioned profile. Referring to FIG. 9, the tooth form or tooth profiles can have a variety of geometric shapes. For example, the tooth profiles can have a trapezoidal shape, a curvilinear shape, a modified curvilinear shape, and the like.

It will be appreciated that unlike gear teeth that engage one another dependent upon an exact match at the conjugation point, the present pulley tooth form or tooth profile is not dependent on a pressure angle and a single point/line contact, rather, it matches a form from a drive element to a driven element. The void in the driven element is filled and moved by the matching form from the drive element.

An output 46 is mounted to an outer surface of the timing ring 16. In embodiments, output 46 is a shaft and the cup-shaped body has a circular cross-section with the output shaft 46 mounted to an outer surface of the cup bottom, collinear with the circular cross-section. The output shaft 46 can be a separate element mounted to the timing ring 16 or it can be formed integral with the timing ring 16. In embodiments, the output shaft 46 includes a key or key way 48 for mounting to a downstream component (not shown). Other mounting arrangements for mounting the output shaft 46 to a downstream component will be appreciated by those skilled in the art and are within the scope and spirit of the present disclosure.

Figure 3D:
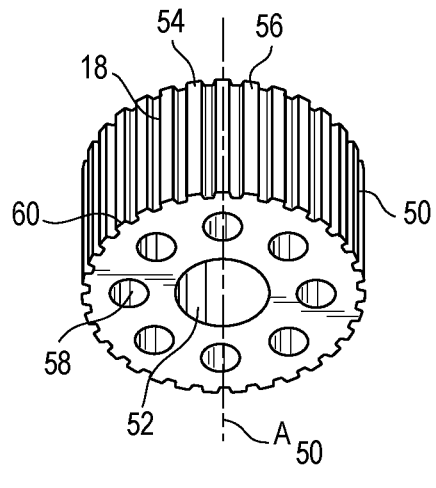

Referring to FIG. 3D, the pulley 18 is positioned in the timing ring 16. The pulley 18 includes a cylindrical body 50 defining a longitudinal axis $A_{50}$ and a central or shaft opening 52 concentric with (lying along) the axis $A_{50}$. The shaft opening 52 is configured to receive the input shaft 20.

The body includes a series of tooth profiles 54 extend longitudinally along an exterior surface of the body 50. The tooth profiles 54, like the timing ring tooth profiles 40 are a series of equally spaced, symmetrical, longitudinally oriented geometrically dimensioned profile pulley or timing ring tooth forms or tooth profiles 54 having a raised central ridge 56 formed along an exterior wall of the body 50 and like the timing ring tooth profiles 40, may be characterized as elongated gear tooth profiles having a geometrically dimensioned profile. Again, as with the timing ring tooth profiles 40, it will be appreciated that unlike gear teeth that engage one another dependent upon an exact match at the conjugation point, the present pulley tooth profiles 54 are not dependent on a pressure angle and a single point/line contact, rather, the pulley tooth profiles 54 match a form from the drive element to the driven element. The void in the driven element is filled and moved by the matching form from the drive element; in the present reducer 10, the timing ring tooth profiles 40 and the pulley tooth profiles 54 are configured to mate and cooperate with one another as will be described in detail below.

The pulley 18 further includes a series of equally spaced, circumferentially positioned pin openings or pin bores 58. In the illustrated embodiment, the pulley 18 includes eight equally circumferentially spaced pin bores 58 about halfway between the longitudinal axis $A_{50}$ and an outer periphery 60 of the pulley 18. The pin bores 58 have a diameter $d_{58}$. As will be appreciated from a study of the figures, the location and number of pin bores 58 can vary, and the diameter $d_{58}$ will vary depending upon the desired use and requirements.

Figure 3F:
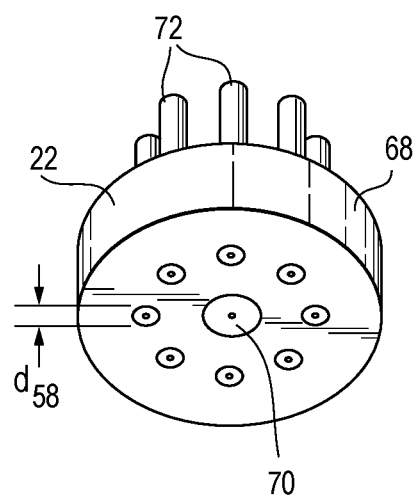
Figure 3E:
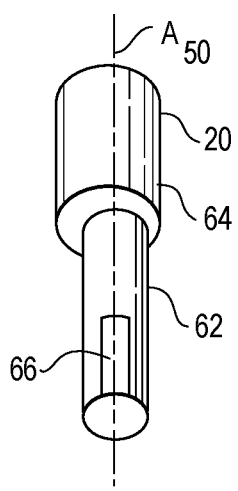

Referring to FIG. 3E, the input shaft 20 includes a first shaft portion 62 and a second shaft portion 64. The second shaft portion 64 is configured to be positioned in the pulley central shaft opening 52, and the first shaft portion 62 is configured to be positioned in the pin plate shaft opening 70. In an embodiment, the first and second shaft portions 62, 64 are eccentric relative to one another. That is, the second shaft portion 64 is not concentric with the input shaft axis $A_{20}$. Rather, the axes are offset relative to one another. In this configuration, as the first shaft portion 62 rotates, the second shaft portion 64 cams against the pulley 18 to effect the nutational movement of the pulley 18. The input shaft 20 can include a key or key way 66 for mounting to an upstream component (not shown), for example, a motor. Other mounting arrangements for mounting the output shaft 20 to the upstream component will be appreciated by those skilled in the art and are within the scope and spirit of the present disclosure.

As seen in FIG. 3F, the illustrated drive plate, formed as a pin plate 22 includes a body 68, a central shaft opening 70 and a series of pins 72 extending from the body 68. The pins 72 are configured to mate and cooperate with the pulley pin bores 58. The pins 72 are sized so as to loosely fit into the pin bores 58 so that, as described below, the pully 18 can nutate relative to the pin plate 22. That is, the pulley 18 does not rotate, rather it nutates or wobbles as it is driven by the input shaft second portion 64 and is limited by the pin plate pins 72. As noted above, the input shaft 20 is positioned in and extends beyond the pin plate 22 relative to pulley 18. That is, when assembled, the input shaft 20 extends through and beyond the pin plate 22.

It will be appreciated that the pins 72 as they are positioned in the pulley pin bores 58 serve to limit movement or nutation of the pulley 18. As such, the pin plate 22 serves as a support for the pulley 18, and allows the pulley 18 to nutate as it is driven by the input shaft second (eccentric) 64. It will be appreciated that this eccentric drive arrangement can be accomplished in a variety of ways, which other eccentric drive configurations are within the scope and spirit of the present disclosure. The pin bore diameter $d_{58}$ less the pin diameter $d_{72}$ is the calculated difference between the pitch diameters of the timing ring 16 and the pulley 18 which is the width of the tooth profile. For example, in an XL pulley the tooth profile is 0.20 inches. So, for a 30:1 ratio the difference between the pin bore diameter $d_{58}$ and the pin diameter $d_{72}$, when engaged, is 0.20 inches. It will thus be appreciated that as the number of tooth profiles 54 on the pulley 18 decrease, the nutational movement (the wobble) of the pulley increases.

As assembled, the pin plate 22, pulley 18 and timing ring 16 are positioned in the housing 12. In an embodiment, the input shaft 20 is positioned, in part in the pulley 18, in part in the pin plate 22, and in part, extending beyond (out of) the pin plate 22. The first shaft portion 62 is positioned in the pulley shaft opening 52 and the second shaft portion 64 is positioned in the pin plate shaft opening 70. It will be appreciated that the input shaft 20 can be made in sections, and made be fabricated as part of the pin plate 22 and/or as part of the pulley 18, and that such alternative configurations are within the scope and spirit of the present disclosure.

Further, as assembled, the sleeve bearing 14 is position on the output shaft 46. The components (the pin plate 22, input shaft 20, pulley 18, timing ring 16 and sleeve bearing 14) can all be housed in the housing 12. When assembled, some of the pulley tooth profiles 54 are engaged with some of the timing ring tooth profiles 40. The components can all be housed between the end caps 24a,b on either side of the housing 12 to enclose the reducer 10 components.

Figure 4:
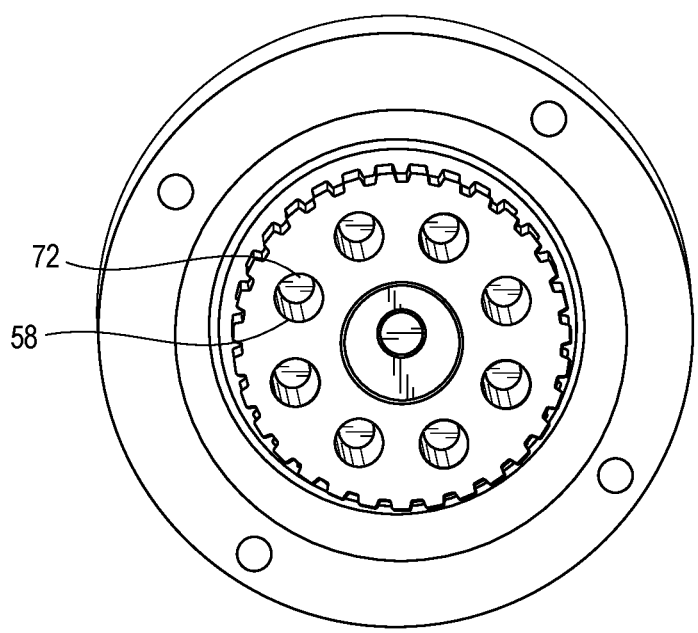
FIG. 4 illustrates the eccentric relationship between the pin plate, input shaft and pulley.
Figure 8:
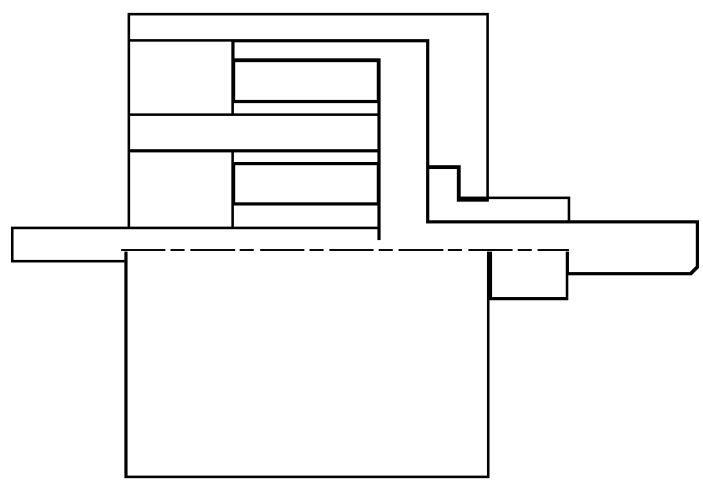
FIG. 8 is a sectional view of the embodiment of the nutational cycloidal reducer shown assembled.

The eccentric connection of the input shaft second portion 64 and the pulley 18, along with the oversized pin bores 58 in the pulley 18 allow for engagement of multiples of the timing ring tooth profiles 40 and the pulley tooth profiles 54. That is, referring for example to FIG. 5, because the pulley 18 is eccentrically mounted on the input shaft 20, multiple timing ring tooth profiles 40 and multiple pulley tooth profiles 54 are engaged with each other. Referring to FIG. 4, the nutational movement of the pulley 18 (relative to the timing ring 16) is facilitated by the pin bores 58 having a larger diameter $d_{58}$ than the pin plate pins 72 (which allows the pulley 18 to "wobble" within the timing ring 16).

Figure 10A:
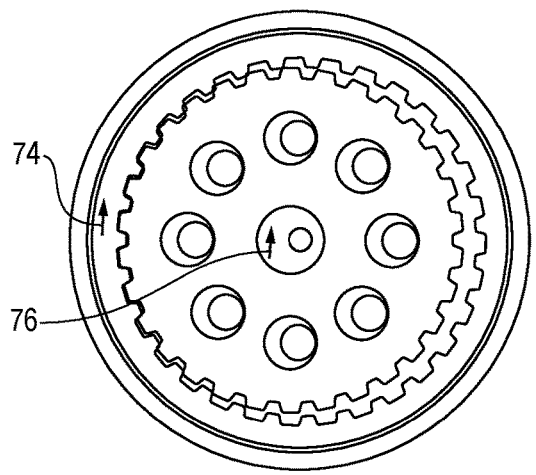
FIGS. 10A-10D illustrate the positional relationship of the pin plate, pulley and timing ring at various stages of rotation/nutation.

Referring to FIGS. 10A-10D, there is shown an example of the present reducer 10 at four positions. For purposes of the following explanation, the arrow 72 in the timing ring 16 and the arrow 76 in the input shaft 20 are fixed on the timing ring 16 and input shaft 20, respectively. In FIG. 10A, the pulley 18 is at the far left and engages the timing ring 16 at about the arrow 74, the input shaft eccentric portion 64 is also at about the far left and the pulley 18 is off-center of the pin plate 22, also to the far left. The timing ring arrow 74 and the input shaft arrow 76 are about aligned with each other relative to the input shaft axis $A_{20}$. About 9 pulley tooth profiles 54 are engaged with about 9 timing ring tooth profiles 40.

Figure 10B:
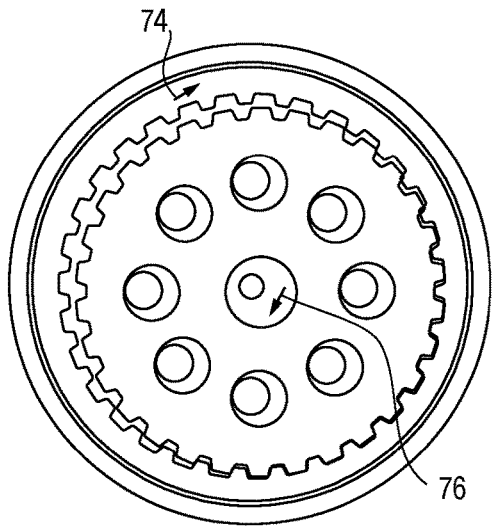

Referring to FIG. 10B, as the input shaft 20 rotates in the direction of the arrow 74 (clockwise), the input shaft eccentric portion 64 rotates and nutates the pulley 18 (upward and then) to the right, and drives (rotates) the timing ring 16 (referring to the arrow 76).

Figure 10C:
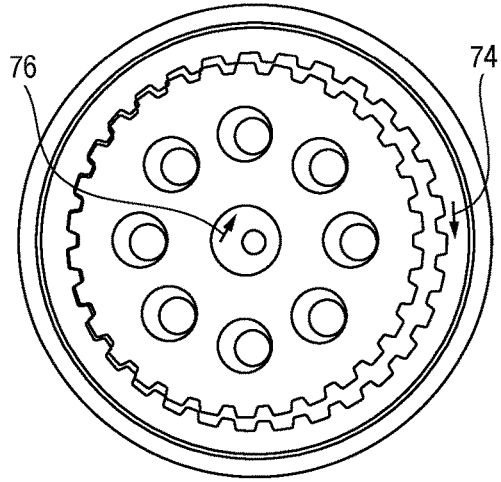

As seen in FIG. 10C, the input shaft 20 continues to rotate in the direction of the arrow 74 (clockwise), the input shaft eccentric portion 64 rotates and nutates the pulley 18 (downward and then) to the left, and drives (rotates) the timing ring 16 (referring to the arrow 76).

Figure 10D:
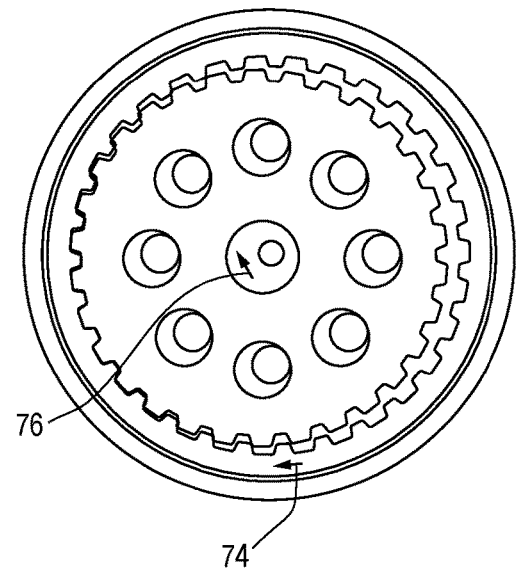

And, as seen in FIG. 10D, the input shaft 20 rotates in the direction of the arrow 74 (clockwise), the input shaft eccentric portion 64 rotates and nutates the pulley 18 (upward and then) to the left, and drives (rotates) the timing ring 16 (referring to the arrow 76).

It will be appreciated that the nutational movement of the pulley 18 translates to rotational movement of the timing ring 16 at a reduced speed and an increased torque. It will also be appreciated that the engagement of multiple pulley tooth profiles 54 and timing ring tooth profiles 40 provide an exponentially larger area over which the force from the pulley 18 is transferred to the timing ring 16. This is unlike conventional gear teeth that have a one-tooth-to-one-tooth engagement, the present reducer 10 also provides for a fuller engagement of the tooth profiles 40, 54 with one another as the engagement of each tooth with its complement is over the entire surface area of the tooth (rather than a point-to-point engagement), and as such, is not dependent on a pressure angle.

Not only does the present nutational cycloidal reducer 10 use a configuration that allow multiple tooth profiles 40, 54 to engage one another, but a relationship between the number of timing ring tooth profiles 40 and the number of pulley tooth profiles 54 provides the reduction ratio desired. The present nutational cycloidal reducer 10 incorporates a "number (n) tooth-less" relationship between the number of timing ring tooth profiles 40 and the number of pulley tooth profiles 54. For example, as seen in FIG. 5, with a timing ring having thirty (30) tooth profiles 40 and a pulley having twenty nine (29) tooth profiles 54 (n=1, the number of tooth profiles less in the pulley 18 than in the timing ring), the ratio is 30:1. And, as seen in FIG. 6, with a timing ring 16 having 30 tooth profiles and a pulley 18 having 28 tooth profiles (n=2, the number of tooth profiles less in the pulley 18 than in the timing ring 16), the ratio is 30/2:1 or 15:1. Likewise, as seen in FIG. 7, with a timing ring 16 having 30 tooth profiles and a pulley 18 having 27 tooth profiles (n=3, the number of tooth profiles less in the pulley than in the timing ring), the ratio is 30/3:1 or 10:1. Effectively, the reduction ratio can be defined by:

$$\frac{\text{\# of timing ring longitudinally extending tooth profiles}}{(\text{\# of timing ring longitudinally extending tooth profiles} - \text{\# of pulley longitudinally extending tooth profiles})}$$

In the above examples, the reduction ratio of 30:1 multiplies the torque by a factor of 30, the reduction ration of 15:1 multiplies the torque by a factor of 15, and the reduction ratio of 10:1 multiplies the torque by a factor of 10. In order to accommodate the increased eccentricity of the pulley 18 as the reduction ratio increases (as the differential of the number of tooth profiles increases), the pin bore diameter $d_{58}$ is increased.

The present nutational cycloidal reducer 10 can be staged to provide reduction ratios as much as 100:1 for a single stage reducer (for example, a 100:1 reduction ratio can be accomplished with a timing ring 16 having 100 tooth profiles and a pulley 18 having 99 tooth profiles) and as much as 10,000:1 for a two stage reducer. The reducer 10 multiplies torque in direct proportion to the reduction ratio, and provides a 92% mechanical efficiency for a single-stage reducer, and a 84% efficiency for a two-stage reducer. For two stage reducers, the output shaft 46 of the second stage is equal to the diameter of the input shaft 20 for the first stage.

Further, the present reducer 10 can be used in both a forward direction and a reverse direction with no changes to the reducer 10 components.

The various components can be formed from a wide variety of materials. For example, the housing 12 can be formed from a wide variety of polymeric (plastic) materials, metals and the like. The sleeve bearing 14 can be formed from, for example, a polymeric (plastic) material, metals such as bronze, steel and the like. The timing ring 16 can be formed from, for example, a polymeric material such as a thermoplastic elastomer, metals and the like. The output shaft 46 can be formed integral with the timing ring 16 or it can be formed as a separate element and can be formed from similar or different materials than the timing ring 16.

The pulley 18 can also be formed from a wide variety of materials, such as a thermoplastic resin. The resin can be reinforced to meet the specific end user requirements (use of the reducer) and standards for plastic/polymeric molded timing belt pulleys. The input shaft 20 can likewise be formed from a wide variety of materials. In an embodiment the input shaft 20 is an overmolded part with the first part 62 formed from, for example a metal such as stainless steel and the second part 64 overmolded onto the first part 62, with the overmolded second part 64 formed from, for example a thermoplastic resin. It is anticipated that both the first and second parts 62, 64 can also be formed from the same materials as separate parts or as a single unitary element.

The pin plate 22 can likewise be formed from a wide variety of materials. In an embodiment, the pin plate 22 is formed from a polymeric material, such as a resin in which the pins 72 are mounted. The pins 72 can be formed from polymeric materials, metals and the like. The pin plate polymeric body 68 can be overmolded onto the pins 72, the pins 72 can be secured in or on the pin plate body 68, all of which configurations are within the scope and spirit of the present disclosure.

The present nutational cycloidal reducer 10 provides a number of practical benefits and advantages over known reducers. For example, the present reducer 10 provides speed reduction/torque multiplication in a small envelope with light weight components. Moreover, there is minimal friction, and this is especially so when the functional components are plastic/polymeric. The present reducer 10 has zero backlash and automatic braking and no back-driving.

The eccentric input shaft 20 in conjunction with the "(n) tooth less" relationship between the number of timing ring tooth profiles 40 and the number of pulley tooth profiles 54 (also viewed as no single point tooth contact) permit the load to be carried by several tooth profiles in contact with one another to carry the torque load. That is, in the present reducer 10, the pulley tooth form is not dependent on a pressure angle and a single point/line contact, rather, it matches a form from the drive element to the driven element. It has been observed that the present reducer 10 has low noise with no vibration, and in some embodiments requires no lubrication (and thus has no fluid leakage).

The reducer 10 can be fabricated at low cost as many of the parts can be made using injection molded plastic materials and methods. In addition, there are few or no fasteners in the assembly, as all sub-assemblies can be configured to snap together and most of the parts can be snap fit.

In order to change reduction ratios, only two parts need to be changed, the pulley 18 and the timing ring 16. Advantageously, there are only three moving parts per stage, the input shaft 20, pulley 18 and timing ring 16. The present reducer 10 is anticipated to have a long service life with minimal or no maintenance and can accommodate any motor interface.

In the embodiments above, it will be appreciated that where a specific connection between features which are described as driving or being driven by the other, or similar description indicative of a mechanical connection between the features, that the connection may be, for example, a splined connection, a geared connection, a friction connection or other known mechanical connection suitable for allowing one feature to drive or be driven by another.

It is understood that the features described with respect to any of the embodiments above may be implemented, used together with, or replace features described in any of the other embodiments above. It is also understood that description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, in is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A nutational cycloidal reducer for reducing an input rotational speed to an output rotational speed by a reduction ratio, the reducer comprising:
a timing ring having a circular cross-section defining an axis and having a length, the timing ring having an internal wall having a series of longitudinally extending tooth profiles;
an output operably connected to the timing ring;
a pulley having a body having a central opening, a series of longitudinally extending tooth profiles and a plurality of circumferentially disposed pin bores formed in the body;
an input shaft having a first shaft portion, a second shaft portion and a longitudinal axis, the first shaft portion being concentric with the longitudinal axis and the second shaft portion being eccentric with the longitudinal axis;
a pin plate having a body having a central opening and a plurality of pins extending from a side thereof,
wherein the pulley is positioned in the timing ring with some of the plurality of pulley longitudinally extending tooth profiles engaged with some of the plurality of timing ring longitudinally extending tooth profiles, wherein the second shaft portion is positioned in the pulley central opening, wherein the pin plate is positioned adjacent the pulley with the pins positioned in the pulley pin bores and the input shaft extending through the pulley central opening,
wherein the input shaft drives the pulley nutationally in the timing ring, engaging some of the plurality of pulley longitudinally extending tooth profiles with some of the plurality of timing ring longitudinally extending tooth profiles, which drives the timing ring and output concentrically, and
wherein the pulley has one or more less longitudinal extending tooth profiles than the timing ring, and wherein the reduction ratio is defined by $$\frac{\text{\# of timing ring longitudinally extending tooth profiles}}{(\text{\# of timing ring longitudinally extending tooth profiles} - \text{\# of pulley longitudinally extending tooth profiles})}.$$

2. The reducer of claim 1, wherein the output is a shaft.
3. The reducer of claim 2, wherein the shaft is formed integral with the timing ring.
4. The reducer of claim 1, wherein the input shaft second portion is formed as an overmold over the input shaft first portion.
5. The reducer of claim 1, wherein the pulley includes 8 pin bores and wherein the pin plate includes 8 pins.
6. The reducer of claim 1, further including a housing, wherein the timing ring, pulley and pin plate are positioned in the housing.
7. The reducer of claim 6, further including end caps on the housing.
8. The reducer of claim 7, further including a bearing positioned on the output at about one of the end caps.
9. The reducer of claim 1 wherein the timing ring includes 30 longitudinally extending tooth profiles and the pulley includes 29 longitudinally extending tooth profiles, and wherein the reducer has a 30:1 reduction ratio.
10. The reducer of claim 1 wherein the timing ring includes 30 longitudinally extending tooth profiles and the pulley includes 28 longitudinally extending tooth profiles, and wherein the reducer has a 15:1 reduction ratio.
11. The reducer of claim 1 wherein the timing ring includes 30 longitudinally extending tooth profiles and the pulley includes 27 longitudinally extending tooth profiles, and wherein the reducer has a 10:1 reduction ratio.
12. A nutational cycloidal reducer, comprising:
a timing ring having a circular cross-section defining an axis and having a length, the timing ring having an internal wall having a series of longitudinally extending tooth profiles;
an output operably connected to the timing ring;
a pulley having a body having a central opening and a series of longitudinally extending tooth profiles;
an input shaft having a first shaft portion, a second shaft portion and a longitudinal axis, the first shaft portion being concentric with the longitudinal axis and the second shaft portion being eccentric with the longitudinal axis;
a limiting member,
wherein the pulley is positioned in the timing ring with some of the plurality of pulley longitudinally extending tooth profiles engaged with some of the plurality of timing ring longitudinally extending tooth profiles, wherein the second shaft portion is positioned in the pulley central opening, wherein the input shaft rotates driving the pulley in a nutational movement, engaging some of the plurality of pulley longitudinally extending tooth profiles with some of the plurality of timing ring longitudinally extending tooth profiles, which drives the timing ring and output concentrically, wherein the pulley has one or more less longitudinally extending tooth profiles than the timing ring, and wherein a reduction ratio is defined by $$\frac{\text{\# of timing ring longitudinally extending tooth profiles}}{(\text{\# of timing ring longitudinally extending tooth profiles} - \text{\# of pulley longitudinally extending tooth profiles})},$$

and wherein the limiting member limits movement of the pulley to a nutational movement.

13. The reducer of claim 12 wherein the timing ring includes 30 longitudinally extending tooth profiles and the pulley includes 29 longitudinally extending tooth profiles, and wherein the reducer has a 30:1 reduction ratio.

14. The reducer of claim 12 wherein the timing ring includes 30 longitudinally extending tooth profiles and the pulley includes 28 longitudinally extending tooth profiles, and wherein the reducer has a 15:1 reduction ratio.

15. The reducer of claim 12 wherein the timing ring includes 30 longitudinally extending tooth profiles and the pulley includes 27 longitudinally extending tooth profiles, and wherein the reducer has a 10:1 reduction ratio.

16. The reducer of claim 12, further including a housing, wherein the timing ring, pulley and pin plate are positioned in the housing.

17. The reducer of claim 16, further including end caps on the housing.

18. The reducer of claim 17, further including a bearing positioned on the output at about one of the end caps.

19. The reducer of claim 18, wherein one or more of the timing ring, the pulley and the drive plate are formed from polymeric materials.

20. The reducer of claim 1, wherein one or more of the timing ring, the pulley and the pin plate are formed from polymeric materials.

* * * * *